(12) United States Patent
Watson et al.

(10) Patent No.: US 8,464,578 B2
(45) Date of Patent: Jun. 18, 2013

(54) MULTI-FUNCTIONAL VEHICLE FUEL DISPLAY

(75) Inventors: Angela L. Watson, Ann Arbor, MI (US);
Steven Bishop, Mountain View, CA (US); Sohel Merchant, Canton, MI (US); Craig Sandvig, Sterling Heights, MI (US); Ivette Hernandez, Westland, MI (US); David Watson, Ann Arbor, MI (US); Engin Erdogan, San Francisco, CA (US); Altay Jun Wakui Sendil, Pacifica, CA (US); Susanne Stage, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/286,579

(22) Filed: Nov. 1, 2011

(65) Prior Publication Data

US 2012/0042716 A1 Feb. 23, 2012

Related U.S. Application Data

(62) Division of application No. 12/371,710, filed on Feb. 16, 2009, now Pat. No. 8,082,774.

(51) Int. Cl.
*G01F 23/00* (2006.01)
(52) U.S. Cl.
USPC ..................................................... 73/114.54

(58) Field of Classification Search
USPC ............................ 73/114.52, 114.53, 114.54
See application file for complete search history.

(56) References Cited

U.S. PATENT DOCUMENTS

| | | | |
|---|---|---|---|
| 4,646,059 A | 2/1987 | Iwamoto et al. | |
| 4,647,902 A | 3/1987 | Teshima et al. | |
| 5,371,510 A | 12/1994 | Miyauchi et al. | |
| 5,693,876 A | 12/1997 | Ghitea, Jr. et al. | |
| 6,453,731 B1 | 9/2002 | Yaegashi | |
| 7,726,255 B2 | 6/2010 | Nakamichi | |
| 7,966,121 B2* | 6/2011 | Aoyagi et al. | 701/123 |
| 2003/0137278 A1* | 7/2003 | Kondo | 320/132 |
| 2005/0021222 A1 | 1/2005 | Minami et al. | |
| 2007/0176762 A1 | 8/2007 | Aoyagi et al. | |
| 2008/0163811 A1 | 7/2008 | Nakamichi | |
| 2010/0057281 A1 | 3/2010 | Lawyer et al. | |

* cited by examiner

*Primary Examiner* — Eric S McCall
(74) *Attorney, Agent, or Firm* — Jennifer M. Stec; Brooks Kushman P.C.

(57) ABSTRACT

A multi-functional, composite fuel display for displaying both fuel level information and fuel economy information is provided. The fuel level is displayed using a plurality of bar segments, each corresponding to a single unit of fuel. Once a single unit of fuel is consumed, the corresponding bar segment changes size to indicate an average fuel economy for that unit of fuel. The bar segment corresponding to the current unit of fuel being consumed changes size in real time to indicate instantaneous fuel economy. An indicator is provided over the bar segments corresponding to single unit of consumed fuel to indicate average fuel economy for the current tank of fuel.

18 Claims, 4 Drawing Sheets

MULTI-FUNCTIONAL VEHICLE FUEL DISPLAY

CROSS-REFERENCE TO RELATED APPLICATIONS

This application is a divisional of U.S. application Ser. No. 12/371,710, filed Feb. 16, 2009, the disclosure of which is incorporated in its entirety by reference herein.

TECHNICAL FIELD

One or more embodiments of the present application relate to a system and method for displaying instantaneous fuel economy, average fuel economy, and fuel tank level using an information display within a vehicle.

BACKGROUND

Vehicles, whether passenger or commercial, include a number of gauges, indicators, and various other displays to provide the vehicle operator with information regarding the vehicle and its surroundings. With the advent of new technologies, such as hybrid electric vehicles (HEVs), has come a variety of new gauges and information displays that help operators to better learn the operation of these vehicles that utilize new technology. For example, many HEVs incorporate gauges that attempt to provide the operator with information on the various hybrid driving states. These gauges indicate to the operator when the vehicle is being propelled by the engine alone, the motor alone, or a combination of the two. Similarly, a display may indicate when the motor is operating as a generator, and is recharging an energy storage device, such as a battery.

With regard to HEVs, it is known that some drivers may not be able to achieve desired fuel economy numbers, in part because of driving habits. In many cases, drivers are willing to modify their behavior, but are unable to translate recommended techniques into real changes in their driving habits. Moreover, gauges or displays that merely indicate a general fuel tank level and unassociated fuel economy readings provide little insight for the driver on current or recent driving efficiencies in order to modify driving habits to improve fuel economy.

Therefore, a need exists for an information display system for a vehicle, and a method for displaying such information, that provides information that will help a driver increase fuel economy by indicating a relationship between units of fuel remaining in a fuel tank, instantaneous fuel economy, and/or average fuel tank economy values within a multifunctional display gauge, thereby facilitating economical driving choices by a driver.

DETAILED DESCRIPTION

Figure 1:
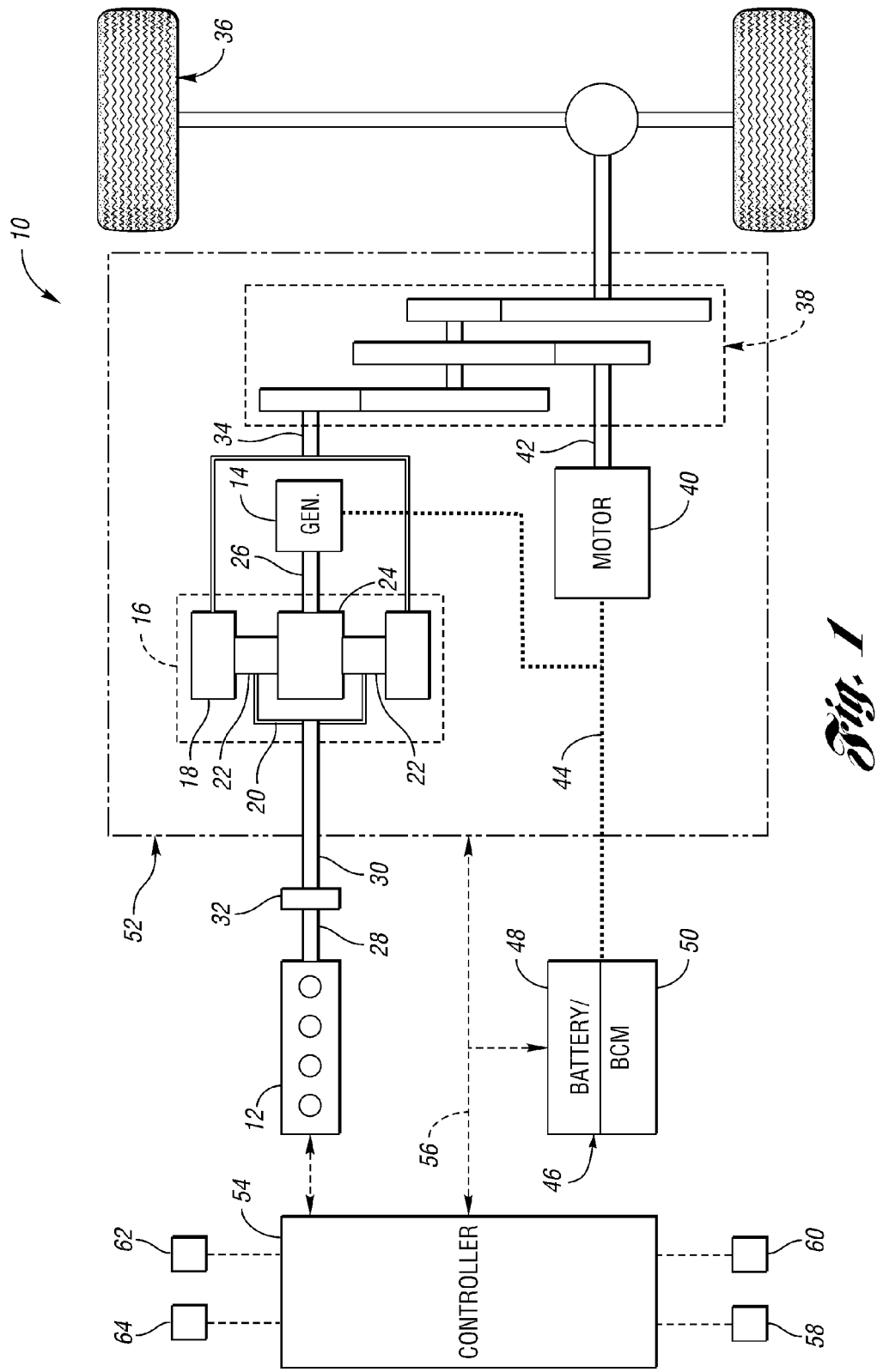
FIG. 1 is a simplified, exemplary schematic representation of a hybrid electric vehicle including an information display system according to one or more embodiments of the present application.

FIG. 1 shows a schematic representation of a vehicle 10, which includes an engine 12 and an electric machine, or a generator 14. The engine 12 and the generator 14 are connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear arrangement 16, and the ring gear 18 is connected to a shaft 34, which is connected to a first set of vehicle drive wheels, or primary drive wheels 36, through a gear set 38.

The vehicle 10 includes a second electric machine, or motor 40, which can be used to output torque to a shaft 42 connected to the gear set 38. Other vehicles within the scope of the one or more embodiments of the present application may have different electric machine arrangements, such as more or fewer than two electric machines. In the embodiment shown in FIG. 1, the electric machine arrangement (i.e. the motor 40 and the generator 14) can both be used as motors to output torque. Alternatively, each can also be used as a generator, outputting electrical power to a high voltage bus 44 and to an energy storage system 46, which includes a battery 48 and a battery control module (BCM) 50.

The battery 48 is a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle control system, shown generally as controller 54, is provided. Although it is shown as a single controller, it may include multiple controllers which may be used to control multiple vehicle systems. For example, the controller 54 may be a vehicle system controller/powertrain control module (VSC/PCM).

A controller area network (CAN) 56 allows the controller to communicate with the transmission 52 and the BCM 50. Just as the battery 48 includes a BCM 50, other devices may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present application. Although illustrated and described in the context of the vehicle 10, which is an HEV, it is understood that embodiments of the present application may be implemented on other types of vehicles, such as those powered by an engine or electronic motor alone.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. The braking system 58 may also include a regenerative braking system, wherein braking energy is captured and stored as electrical energy in the battery 48. Similarly, the accelerator pedal 60 may include one or more sensors, which, like the sensors in the braking system 58, communicate with the controller 54.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The air conditioning system 62 also communicates with the controller 54. The on/off status of the air conditioning system can be communicated to the controller 54, and can be based on, for example, the status of an operator actuated switch, or the automatic control of the air conditioning system 62 based on related functions such as window defrost. In addition to the foregoing, the vehicle 10 may include an information display system 64 that is used to display one or more vehicle operating conditions. The information display system 64 may, as explained in more detail below, provide fuel consumption and economy information to an operator of the vehicle 10.

Figure 2:
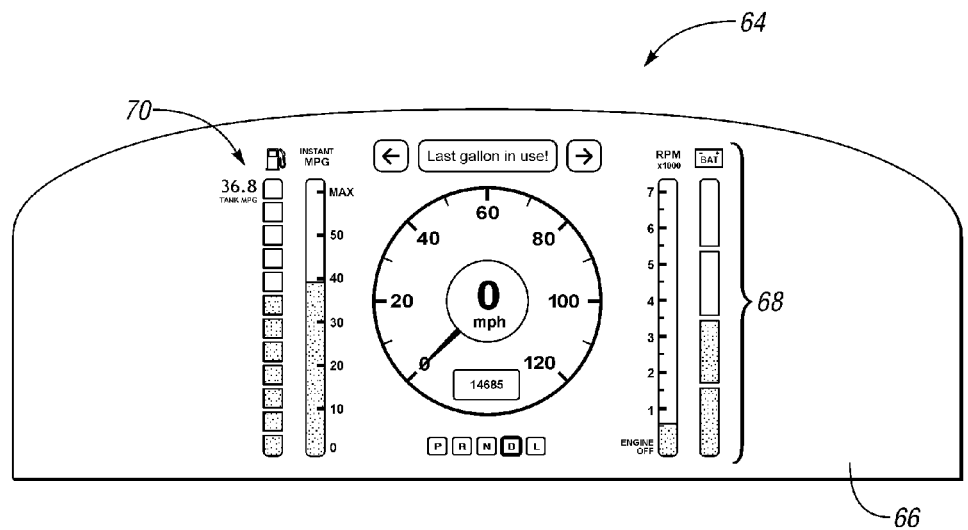
FIG. 2 is a simplified, exemplary front plan view of an information display according to one or more embodiments of the present application.

FIG. 2 shows the information display system 64 in greater detail. The information display system 64 may include an information display 66 for displaying one or more visual gauges 68. The information display 66 may be mounted to a dashboard or instrument panel in a conventional fashion. The information display 66 may be a liquid crystal display (LCD), a plasma display, an organic light emitting display (OLED), or any other display suitable to display fuel volume and economy information. Each visual gauge 68 may display vehicle operating characteristics to an operator of the vehicle so that the operator may make informative driving choices. To this end, the information display 66 may include such visual gauges as a speedometer, tachometer, odometer, battery state of charge (SOC) gauge, engine coolant temperature (ECT) gauge, transmission gauge, or the like. The information display 66 of the information display system 64 may include more or less visual gauges than those described above without departing from the scope of the present application. For example, the information display 66 may include a fuel gauge 70, as will be explained in more detail below.

Figures 3A, 3B, 3C:
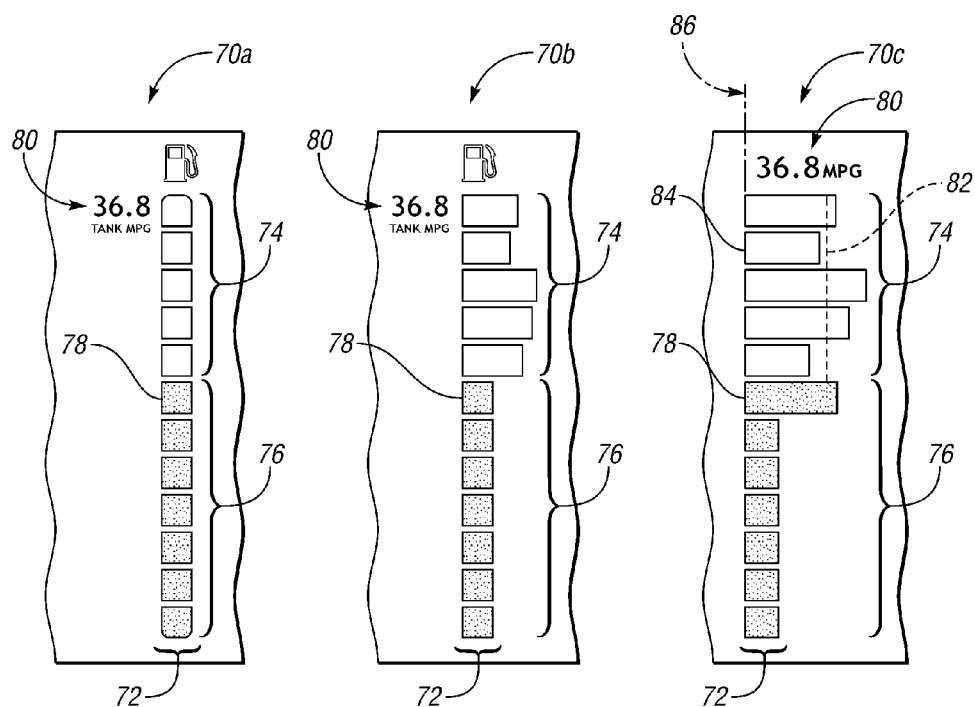
FIG. 3a is a simplified, exemplary diagram depicting a fuel level gauge in a first content state according to an embodiment of the present application.
FIG. 3b is a simplified, exemplary diagram depicting a fuel level gauge in a second content state according to an embodiment of the present application.
FIG. 3c is a simplified, exemplary diagram depicting a fuel level gauge in a third content state according to an embodiment of the present application.

FIGS. 3*a*-3*c* illustrate varying content states of the fuel gauge 70 according to one or more embodiments of the present application. Regarding FIG. 3*a*, a fuel gauge 70*a*, as shown, may include a plurality of bar segments 72. Each distinct bar segment may correspond to a single unit of fuel. Collectively, the plurality of bar segments 72 may correspond to a single tank of fuel. According to an embodiment of the present application, each bar segment 72 may correspond to one gallon of fuel. In this regard, the total number of bar segments may correspond to the fuel tank capacity in number of gallons. For instance, the exemplary fuel gauge 70*a* of FIG. 3*a* is illustrated as having twelve distinct bar segments. Thus, the capacity of the fuel tank of vehicle 10 may be twelve gallons.

Although FIGS. 3*a*-3*c* depict an exemplary fuel gauge 70 for a vehicle 10 having a twelve gallon tank, the fuel gauge 70 may be configured to accommodate vehicles having any fuel capacity. Further, for the sake of simplicity, embodiments of the present application will continue to be described in detail as having each bar segment 72 correspond to a single gallon of fuel although any volumetric unit of fuel is fully contemplated herein (e.g., liters).

Each bar segment 72 of the fuel gauge 70 may have a plurality of display states. One such state shown in FIG. 3*a* may be a fuel consumed state 74. Accordingly, each bar segment 72 displayed in the fuel consumed state 74 may represent a single gallon of fuel consumed by the vehicle 10. Another such state shown in FIG. 3*a* may be a fuel remaining state 76. Accordingly, each bar segment 72 displayed in the fuel remaining state 76 may generally correspond to a single gallon of fuel remaining in the fuel tank of the vehicle 10. In an exemplary embodiment, a bar segment may not change from the fuel remaining state 76 to the fuel consumed state 74 until the entire gallon of fuel to which the bar segment corresponds is fully consumed. Thus, the bar segment in the fuel remaining state that corresponds to the current gallon of fuel being consumed, referred to herein as an active bar 78, may not necessarily indicate that a full gallon is remaining. As shown in the figures, the active bar 78 may be the bar segment displayed in the fuel remaining state immediately adjacent the bar segment corresponding to the most recently consumed gallon of fuel, which is displayed in the fuel consumed state. To this end, the information display system 64 may provide an indication to the operator not only when a gallon of fuel has been consumed, but also approximately how many gallons of fuel remain in the fuel tank.

When the fuel tank is filled to capacity with fuel, each bar segment 72 may be displayed in the fuel remaining state indicating to the operator that the fuel tank is generally full. As each unit of fuel is consumed, the corresponding bar segment may change from the fuel remaining state to the fuel consumed state. In the exemplary fuel gauge 70*a* of FIG. 3*a*, in which each bar segment 72 corresponds to one gallon of fuel, it can be seen that five complete gallons of fuel have been consumed by the vehicle 10 because five bar segments are shown in the fuel consumed state. Moreover, seven bar segments are displayed in the fuel remaining state indicating that at least six complete gallons of fuel remain in the fuel tank. The active bar 78 representing the current gallon of fuel being consumed may indicate a full or partial gallon of fuel remaining.

The fuel gauge 70*a* depicted in FIG. 3*a* may also include a numerical fuel economy readout 80. The numerical fuel economy readout 80 may display a numerical fuel economy value in distance per volume of fuel (e.g., miles per gallon or L/100 km). The value displayed by the fuel economy readout 80 may correspond to one of a plurality of selectable fuel economy values. For the sake of simplicity, fuel economy is described herein in units of miles per gallon (MPG), although other units are fully contemplated without departing from the scope of the present application. The fuel economy readout 80 may display a numerical value for average overall fuel economy, average trip fuel economy, average fuel economy for the current tank of fuel, average fuel economy for the current unit (or gallon) of fuel being consumed, instantaneous fuel economy, or the like. In this regard, the information display system 64 may be configured to allow the vehicle operator to toggle through the plurality of selectable fuel economy values for display. Thus, an operator of the vehicle may choose to display fuel economy information relevant to the current tank of fuel being consumed, rather than conventional trip or overall fuel economy values, to better understand the impact of recent driving habits.

Turning now to FIG. 3b, a fuel gauge 70b according to another embodiment of the present application is illustrated. Like FIG. 3a, the fuel gauge 70b includes a plurality of bar segments 72, each of which corresponds to a single unit of fuel (e.g., one gallon). Similarly, each bar segment 72 may be displayed in a plurality of display content states, such as the fuel consumed state 74, the fuel remaining state 76, or the like.

In addition, the fuel gauge 70b depicted in FIG. 3b may provide additional content than the fuel gauge 70a depicted in FIG. 3a. Specifically, a bar segment displayed in the fuel consumed state may also be displayed in various lengths or sizes, as shown in FIG. 3b. The length of each bar segment 72 displayed in the fuel consumed state may visually indicate the average fuel economy for the corresponding unit of consumed fuel. For instance, if each bar segment 72 corresponds to one gallon of fuel, then once a gallon of fuel is consumed, the associated bar segment changes size to indicate the average fuel economy over the course of that gallon, in addition to changing from the fuel remaining state 76 to the fuel consumed state 74. It is contemplated that the length of the bar segment may represent an actual fuel economy value. In general, however, the shorter the bar length, the lesser the fuel economy value; the longer the bar length, the greater the fuel economy value. In the exemplary embodiment in which each bar segment 72 corresponds to one gallon of fuel, then a bar segment in the fuel consumed state can indicate to the operator the number of miles driven over that gallon of fuel.

Similar to the fuel gauge 70a depicted in FIG. 3a, the fuel gauge 70b of FIG. 3b may also display the numerical fuel economy readout 80. As described above with respect to FIG. 3a, the fuel economy readout 80 may indicate one or more fuel economy values that can be toggled for display by an operator of the vehicle 10.

Accordingly, the information display system 64 may provide an operator of the vehicle 10 an indication of average fuel economy for each gallon of fuel consumed by the vehicle for the present tank of fuel. Each bar segment 72 of consumed fuel can provide an operator a relative comparison of fuel economy performance on a per gallon basis. Therefore, an operator can assess or modify driving habits in order to improve fuel economy.

FIG. 3c depicts yet another exemplary embodiment of a fuel gauge 70c for display by an information display system 64 in accordance with the present application. As seen therein, the fuel gauge 70c may be displayed in yet another content state. In addition to the content shown and described above with respect to FIGS. 3a and 3b, the fuel gauge 70c of FIG. 3c may display additional fuel consumption and economy information in a composite display gauge. In particular, the fuel gauge 70c may display an average fuel economy indicator 82. The average fuel indicator 82 may correspond to an average fuel economy value for the fuel consumed thus far in the current tank of fuel. Alternatively, the average fuel economy indicator may correspond to a longer range or duration of driving than that over the current tank of fuel, such as an average overall fuel economy value, average trip fuel economy, or the like. As shown in FIG. 3c, the average fuel economy indicator 82 may be displayed as a dotted line over each bar segment 72 in the fuel consumed state 74.

Like FIG. 3c, each bar segment 72 in the fuel consumed state 74 may also be displayed with a length representing the average fuel economy corresponding to a gallon of consumed fuel. In that regard, each bar segment 72 in the fuel consumed state may include a base or side 84 fixed at one end establishing an imaginary reference line 86 corresponding to zero MPG, for example. The distance between the average fuel economy indicator 82 and this imaginary reference line 86 may provide an indication of the average fuel economy for the fuel consumed thus far in the fuel tank, much like the length of each individual bar segment 72 may correspond to the average fuel economy over the course of the corresponding unit of fuel. Of course, the average fuel economy indicator 82 may correspond to average trip fuel economy, average overall fuel economy, etc. Accordingly, the average fuel economy indicator 82 may provide additional context to the average fuel economy for each gallon of fuel consumed as indicated by the length of each bar segment 72 in the fuel consumed state 74.

Additionally, the active bar 78 may be displayed having various lengths. Since the active bar 78 corresponds to the current gallon of fuel being consumed by the vehicle 10, its length may, for example, correspond to the average fuel economy of the fuel consumed in the current gallon thus far. Alternatively, the length of the active bar 78 may correspond to the instantaneous fuel economy of the vehicle 10. In either case, the information display system 64 may be configured to continually update the information display 66 by adjusting the length of the active bar 78 to indicate the corresponding information. Accordingly, the active bar 78 may provide a visual representation of additional fuel economy content. Moreover, the length of the active bar 78 relative to the average fuel economy indicator 82 and each bar segment 72 in the fuel consumed state 74 may provide yet more context to the impact on fuel economy of recent and/or current driving habits.

Like FIGS. 3a and 3b, the numerical fuel economy readout 80 may also display one of several fuel economy values as described above. An operator of the vehicle 10 may toggle through the several numerical fuel economy values to obtain desired fuel economy information. In the example where the numerical fuel economy readout 80 corresponds to the fuel economy of the current tank of fuel, then the numerical value may correspond to the fuel economy indicated by the average fuel economy indicator 82.

Additionally or alternatively, the average fuel economy indicator 82 may be associated with the numerical fuel economy readout 80. In this regard, the fuel economy value displayed numerically by the numerical fuel economy readout may correspond to the average fuel economy indicator. As an operator toggles or otherwise selects a particular fuel economy value to be displayed numerically by the numerical fuel economy readout, the average fuel economy indicator may change correspondingly. This may provide even more context to the fuel economy information displayed by the information display system 64 in the fuel gauge 70c.

While FIGS. 3a-3c illustrate various content states of the fuel gauge 70, it should be noted that any one of the fuel gauges 70a-70c, or a combination or sub-combination of the fuel gauges 70a-70c may be provided by the information display system 64. Moreover, if multiple contents states of fuel gauge 70 are available within a given vehicle, then the information display system 64 may be configured to permit an operator may a particular content state or toggle through the various content states.

In view of the foregoing, the information display system 64 may provide a multi-functional, composite visual gauge for displaying both fuel economy and fuel level information. As described, each bar segment 72 may represent a single gallon of fuel, and the plurality of bar segments collectively represents the fuel tank capacity. Moreover, as each gallon of fuel is consumed, the length of the corresponding bar segment may change to reflect the number of miles, for example, that were driven in using that gallon of fuel. Accordingly, the fuel gauge 70 of the present application may provide the vehicle operator with information indicative of the range in miles of the vehicle for the fuel already consumed in the current tank, the average fuel economy for each gallon of fuel consumed, and the approximate number of gallons of fuel remaining in the tank, among other information.

Figure 4:
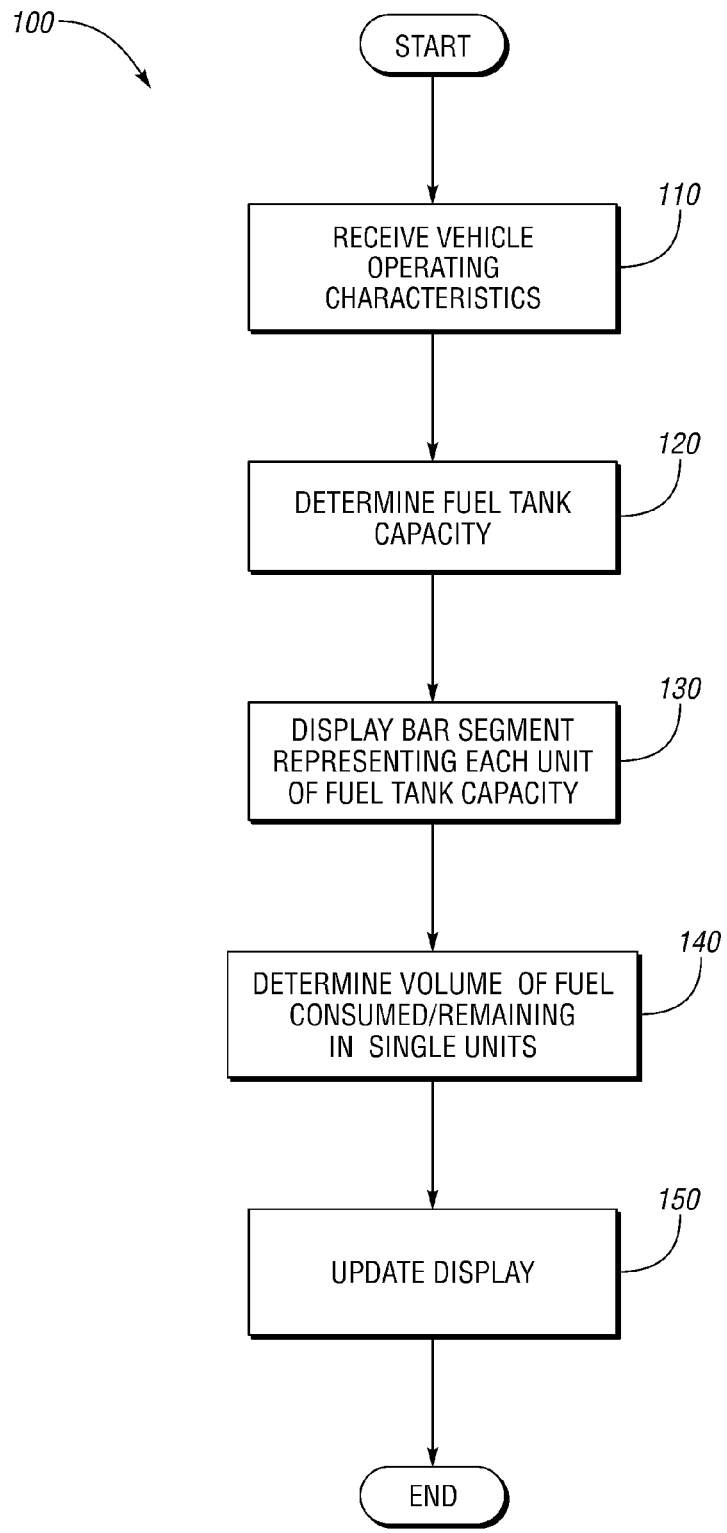
FIG. 4 is a simplified, exemplary flowchart depicting a methodology according to one or more embodiments of the present application.

Turning now to FIG. 4, a simplified, exemplary methodology 100 for displaying the fuel gauge 70 according to one or more embodiments of the present application is illustrated. According to the method, at step 110, the information display system 64 may receive one or more sensed or non-sensed vehicle inputs corresponding to current operating characteristics of the vehicle 10. For example, the controller 54 of the information display system 64 may receive information corresponding to fuel tank capacity, fuel consumed, vehicle speed, distance traveled, accelerator pedal position, or the like. At step 120, the information display system 64 may determine the fuel tank capacity in volumetric units. For instance, the information display system may be provided with a value corresponding to the fuel tank capacity in gallons of fuel. With reference to FIGS. 3a-3c, for example, the system may determine that the fuel tank has a capacity of twelve gallons.

Once the fuel tank capacity is obtained, the fuel gauge 70 may be displayed including the plurality of bar segments 72, each of which corresponds to a single unit of fuel, as provided at step 130. For instance, each bar segment 72 may represent one gallon of fuel and, thus, the fuel gauge 70 may display twelve distinct bar segments. Moreover, each bar segment 72 may be shown in either a fuel remaining state 76 or a fuel consumed state 74. Should each bar segment 72 be displayed in the fuel remaining state 76, an operator of the vehicle 10 might understand that the fuel tank is approximately full. As each gallon of fuel is fully consumed, the corresponding bar segment may change from the fuel remaining state to the fuel consumed state.

To this end, the information display system 64 may next determine the volume of fuel consumed by the vehicle 10 relative to the fuel tank capacity, at step 140. Correspondingly, the volume of fuel remaining in the fuel tank may likewise be determined at step 140. One of ordinary skill in the art understands the myriad of ways in which fuel consumption may be determined or otherwise calculated. Any such method for determining an amount of fuel consumed by the vehicle 10 is fully contemplated herein. Once the volume of fuel consumed by the vehicle 10 from the current tank is obtained, a number of gallons fully consumed may be determined. For example, if it is determined that 5.5 gallons of fuel have been used from the current tank, then it is known that five gallons have been completely consumed and one gallon has been partially consumed, i.e., half consumed.

Next, at step 150, the controller 54 may output a signal corresponding to the number of gallons of fuel consumed and/or the number of gallons of fuel remaining. The output signal may be transmitted such that the information display 66 can be updated by displaying a bar segment in the fuel consumed state for each complete gallon of fuel used and a bar segment in the fuel remaining state for each gallon of fuel remaining or partially remaining. As each additional gallon of fuel is fully consumed, the information display 66 may be updated by displaying the corresponding bar segment transition from the fuel remaining state 76 to the fuel consumed state 74.

Figure 5:
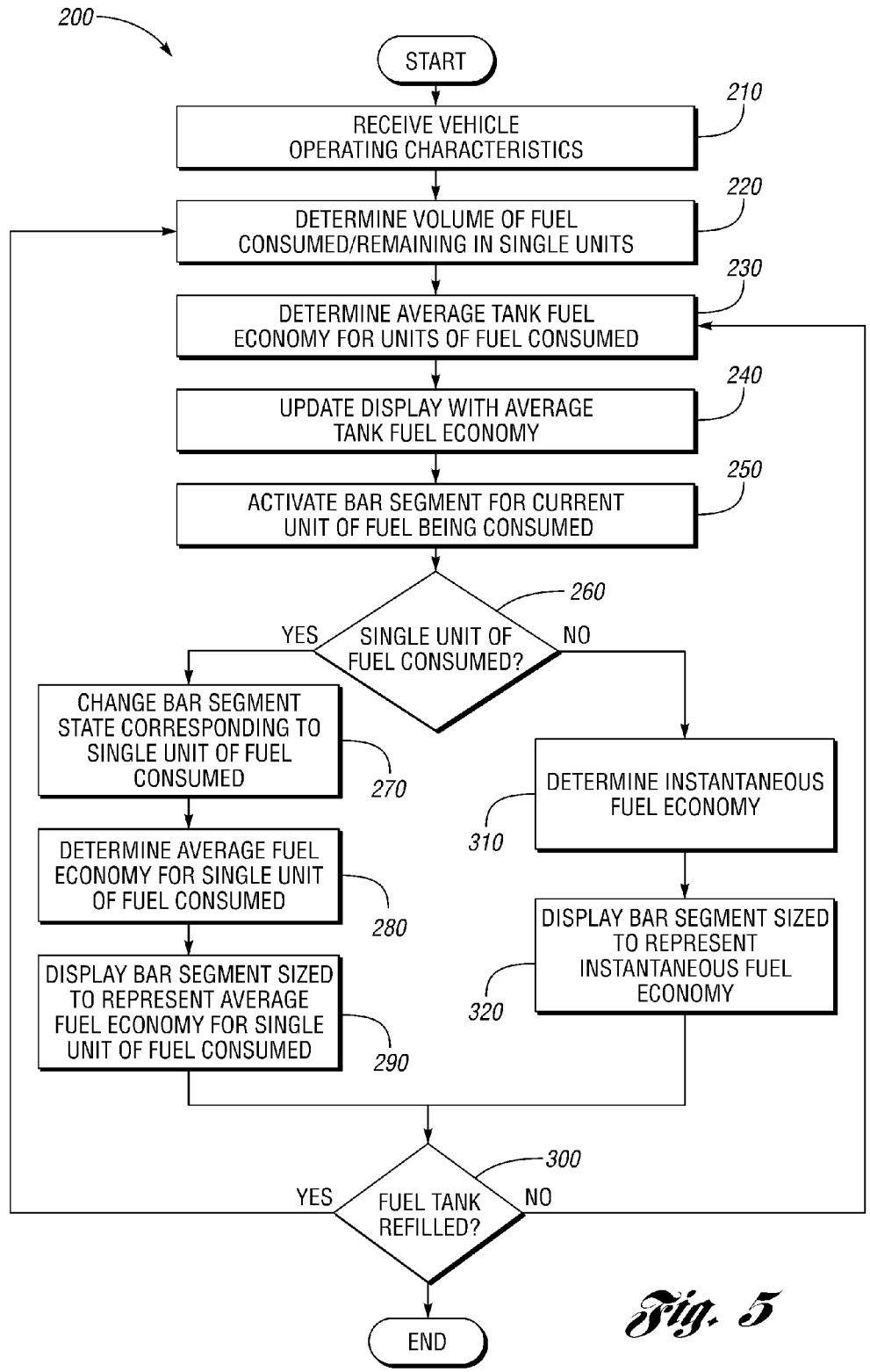
FIG. 5 is an exemplary flowchart depicting a more detailed methodology according to one or more embodiments of the present application.

FIG. 5 depicts a slightly more detailed exemplary methodology 200 for displaying the fuel gauge 70 according to one or more embodiments of the present application. According to the method, at step 210, the information display system 64 may receive one or more sensed or non-sensed vehicle inputs corresponding to current operating characteristics of the vehicle 10. For example, the controller 54 of the information display system 64 may receive information corresponding to fuel tank capacity, fuel consumed, vehicle speed, distance traveled, accelerator pedal position, or the like. The information display system 64 may next determine the volume of fuel consumed by the vehicle 10 relative to the fuel tank capacity, at step 220. Correspondingly, the volume of fuel remaining in the fuel tank may likewise be determined at step 220. One of ordinary skill in the art understands the myriad of ways in which fuel consumption may be determined or otherwise calculated. Any such method for determining an amount of fuel consumed by the vehicle 10 is fully contemplated herein. By determining the amount of fuel consumed, the information display system 64 can determine how many single units of fuel have been fully consumed and update the information display 66 accordingly. With reference to FIGS. 3a-3c, for instance, the information display 66 may determine that five complete gallons of fuel have been consumed. Therefore, the fuel gauge 70 may display five bar segments in the fuel consumed state.

Referring back to FIGS. 3a and 3c specifically, each bar segment 72 in the fuel consumed state 74 may be sized to correspond with the average fuel economy (e.g., in miles per gallon) for its associated gallon of consumed fuel. This may be accomplished by determining the distance traveled over the course of each gallon of fuel consumed. If distance is determined in miles, a miles per gallon value may be determined. Thus, the information display 66 may indicate the number of miles driven for each gallon of fuel consumed.

Not only can miles per gallon over the course of a single gallon of fuel be determined, but other fuel economy values may be determined similarly, such as the average fuel economy obtained for the current tank of consumed fuel, as provided at step 230. Once this tank average fuel economy value is determined, the information display 66 may update the fuel gauge 70 by displaying the average fuel economy indicator 82, as provided at step 240. Referring back to FIG. 3c, the average fuel economy indicator 82 may correspond to an average fuel economy value for the fuel consumed thus far in the current tank of fuel. As shown in FIG. 3c, the average fuel economy indicator 82 may be displayed as a dotted line over each bar segment 72 in the fuel consumed state 74. The average fuel economy indicator 82 can provide context to average fuel economy for each unit of fuel already consumed.

As previously described, each bar segment corresponding to the remaining gallons of fuel may be displayed in the fuel remaining state. Once the volume of fuel consumed in the tank has been determined, then the current unit of fuel being consumed can also be determined. Accordingly, at step 250, the information display system 64 may activate the bar segment for the current gallon of fuel being consumed, referred to as the active bar 78. In the example provided in FIG. 3c, the active bar 78 may correspond to the bar segment immediately adjacent the bar segment representing the most recent gallon of fuel consumed. Activating the active bar 78 at step 250 allows the size of the active bar 78 to be adjusted to provide an indication of the instantaneous fuel economy. Thus, the active bar 78 may change in real time to indicate an instantaneous fuel economy value. The active bar 78 may be displayed in the fuel remaining state 76 until the corresponding gallon of fuel is entirely consumed.

Next, the information display system 64 may determine whether a single unit of fuel has been fully consumed, at step 260. In particular, the system may determine whether the gallon of fuel represented by the active bar 78 has been depleted. If it is determined that the current unit of fuel has been entirely consumed, the method may proceed to step 270. At step 270, the active bar 78 may change from the fuel remaining state 76 to the fuel consumed state 74. Thereafter, the average fuel economy for the most recent unit of fuel consumed may be determined, as provided at step 280. Next, at step 290, the size of the bar segment 72 corresponding to the most recent unit of fuel consumed may be adjusted and displayed to correspond to the average fuel economy for that unit of fuel. Once the active bar changes 78 states from the fuel remaining state to the fuel consumed state, it may no longer be active. The method may then proceed to step 300.

If, however, it is determined at step 260 that the current unit of fuel has not been entirely consumed, the method may proceed to step 310. At step 310, the information display system 64 may determine the instantaneous fuel economy. Once the instantaneous fuel economy has been determined, the active bar 78 may be sized to correspond to the instantaneous fuel economy value, as provided at step 320. Thus, the bar segment associated with the current unit of fuel being consumed can provide an indication of the instantaneous fuel economy of the vehicle. The method may then proceed to step 300.

At step 300, the information display system 64 may determine if an operator of the vehicle 10 has refilled the fuel tank. Should it be determined that the fuel tank has been refilled, the method may return to step 220 where the volume of fuel remaining in the tank can be determined. Alternatively, if it is determined that no fuel has been added to the fuel tank, the method returns to step 230 wherein the tank average fuel economy value may be calculated.

It should be noted that the method of FIGS. 4 and 5 as described herein are exemplary only in that the functions or steps of the methods can be undertaken other than described and/or simultaneously as may be desired, permitted and/or possible.

While the best mode for carrying out the invention has been described in detail, those familiar with the art to which this invention relates will recognize various alternative designs and embodiments for practicing the present invention as defined by the following claims.

What is claimed is:

1. A fuel gauge comprising:
a plurality of bar segments that collectively correspond to a single tank of fuel, each individual bar segment corresponding to a single unit of fuel and having a fuel consumed state and a fuel remaining state, wherein each bar segment in the fuel consumed state is sized according to an average fuel economy value for the unit of fuel to which it corresponds.

2. The fuel gauge of claim 1, wherein the bar segment associated with a current unit of fuel being consumed is displayed in the fuel remaining state.

3. The fuel gauge of claim 2, wherein the bar segment associated with the current unit of fuel being consumed is sized according to an instantaneous fuel economy value.

4. The fuel gauge of claim 1, further comprising a fuel economy indicator corresponding to a fuel economy value.

5. The fuel gauge of claim 4, wherein the fuel economy indicator is an average fuel economy indicator corresponding to an average fuel economy value for a current tank of fuel.

6. The fuel gauge of claim 4, wherein the fuel economy indicator is an average fuel economy indicator corresponding to a trip average fuel economy value.

7. The fuel gauge of claim 4, wherein the fuel economy indicator is an overall fuel economy indicator.

8. The fuel gauge of claim 4, wherein the fuel economy indicator is a numerical fuel economy readout for displaying the fuel economy value.

9. A digital fuel gauge comprising:
a plurality of discrete bar segments that collectively represent a capacity of a fuel tank, each individual bar segment representing an equal unit of fuel and is displayed in one of only two display states, a fuel consumed state and a fuel remaining state, wherein each bar segment changes size based on an average fuel economy value for the unit of fuel to which it corresponds upon transitioning from the fuel remaining state to the fuel consumed state.

10. The fuel gauge of claim 9, wherein the bar segment associated with a current unit of fuel being consumed is displayed in the fuel remaining state.

11. The fuel gauge of claim 10, wherein the bar segment associated with the current unit of fuel being consumed is sized according to an instantaneous fuel economy value.

12. The fuel gauge of claim 9, further comprising a fuel economy indicator corresponding to a fuel economy value.

13. The fuel gauge of claim 12, wherein the fuel economy indicator is an average fuel economy indicator corresponding to an average fuel economy value for a current tank of fuel.

14. The fuel gauge of claim 12, wherein the fuel economy indicator is superimposed over at least the bar segments in the fuel consumed state.

15. The fuel gauge of claim 12, wherein the fuel economy indicator is an average fuel economy indicator corresponding to a trip average fuel economy value.

16. The fuel gauge of claim 12, wherein the fuel economy indicator is an overall fuel economy indicator.

17. The fuel gauge of claim 12, wherein the fuel economy indicator is a numerical fuel economy readout for displaying the fuel economy value.

18. A fuel gauge comprising:
a plurality of bar segments that collectively correspond to a single tank of fuel, each individual bar segment corresponding to a single unit of fuel and having either a fuel consumed state or a fuel remaining state, each bar segment in the fuel consumed state is sized according to an average fuel economy value for the unit of fuel to which it corresponds; and
a fuel economy indicator superimposed over at least the bar segments in the fuel consumed state, the fuel economy indicator corresponding to a fuel economy value.

* * * * *